(12) United States Patent
Cooner, Jr. et al.

(10) Patent No.: US 6,431,516 B1
(45) Date of Patent: Aug. 13, 2002

(54) HOT CUP APPARATUS WITH LOCKING DEVICE

(75) Inventors: James C. Cooner, Jr.; Augusto M. Limcangco, both of Jacksonville, FL (US)

(73) Assignee: B E Aerospace, Inc., Wellington, FL (US)

( * ) Notice: Subject to any disclaimer, the term of this patent is extended or adjusted under 35 U.S.C. 154(b) by 0 days.

(21) Appl. No.: 09/736,887

(22) Filed: Dec. 14, 2000

(51) Int. Cl.[7] .............................................. F16M 13/00
(52) U.S. Cl. .................................... 248/551; 248/311.2
(58) Field of Search ............................. 248/311.2, 551; 219/429, 432, 433, 435, 430, 521; 220/476, 480, 481, 737, 738

(56) References Cited

U.S. PATENT DOCUMENTS

| | | | | |
|---|---|---|---|---|
| 5,024,411 A | * | 6/1991 | Elwell | 248/311.2 |
| 5,167,392 A | * | 12/1992 | Hendricksen | 248/311.2 |
| 5,171,061 A | * | 12/1992 | Marcusen | 297/194 |
| 5,487,519 A | * | 1/1996 | Grabowski | 248/311.2 |
| 5,603,477 A | * | 2/1997 | Deutsch | 248/311.2 |
| 5,692,658 A | * | 12/1997 | Fischer et al. | 224/281 |
| 5,800,011 A | * | 9/1998 | Spykerman | 297/188.19 |
| 5,897,089 A | * | 4/1999 | Lancaster et al. | 248/311.2 |
| 6,059,244 A | * | 5/2000 | Bilandzie et al. | 248/311.2 |
| 6,076,793 A | * | 6/2000 | Yamamoto | 248/311.2 |

* cited by examiner

Primary Examiner—Ramon O. Ramirez
Assistant Examiner—Kofi Schulterbrandt
(74) Attorney, Agent, or Firm—Adams, Schwartz & Evans, P.A.

(57) ABSTRACT

A hot cup apparatus including a locking device for locking a hot cup into the hot cup apparatus, and comprising a mounting bracket for being mounted to a support surface. The mounting bracket includes a mechanical interface for receiving and holding the hot cup in a stationary position adjacent the mounting bracket. A glide block is mounted on said mounting bracket and extends outwardly therefrom in partially-surrounding relation to the hot cup. The glide block includes a space for receiving an arcuate retaining lever mounted for movement between a removal position wherein the retaining lever is retracted into the space in the glide block sufficiently to allow the hot cup to be positioned into and removed from the position adjacent the mounting bracket, and a retention position wherein the retaining lever is extended around the hot cup sufficiently to retain the hot cup in the position adjacent the mounting bracket. A mechanical locking device cooperates with the glide block and the retaining lever for locking the lever into the removal position and the retention position when the retaining lever is positioned in the removal and retention positions, respectively.

9 Claims, 6 Drawing Sheets

HOT CUP APPARATUS WITH LOCKING DEVICE

TECHNICAL FIELD AND BACKGROUND OF THE INVENTION

This invention relates to a hot cup apparatus particularly adapted for use in aircraft, such as large commercial and military aircraft. Most such aircraft have galleys where food and beverages are prepared and stored, and which are designed and constructed with the unique problems attendant to serving food and beverage in flight. For these reasons, aircraft galleys and equipment used in the galleys are designed and manufactured to withstand impact, breakage and to be secured when not in use. Coffee pots and similar appliances are generally manufactured of metal and provided with locking mechanisms for holding the pots in the coffee-making and warming position when not in use. This application discloses and claims a "hot cup" apparatus intended for use in aircraft. A hot cup is made of metal or other durable material and resembles a beer mug, in that it has a cylindrical body, a handle, a lid, and a heating element built into the bottom. The hot cup itself is a conventional Helmco-Lacy hot cup, and is used to heat water or other beverages. The novel features of the invention include a locking device which permits the hot cup to be positioned into and removed from a mounting bracket quickly, easily and safely. The lock prevents dislodgment of the hot cup from the mounting bracket and maintains an electrical interface between the hot cup and the mounting bracket.

SUMMARY OF THE INVENTION

Therefore, it is an object of the invention to provide a hot cup apparatus which includes a locking device for locking the hot cup into a desired position in a mounting bracket.

It is another object of the invention to provide a hot cup apparatus which is easily manipulated.

It is another object of the invention to provide a hot cup apparatus which includes a locking device which is positively maintained in both a retention position and removal position.

It is another object of the invention to provide a hot cup apparatus which maintains the hot cup in an electrical interface with a supply of electricity.

These and other objects of the present invention are achieved in the preferred embodiments disclosed below by providing a hot cup apparatus including a locking device for locking a hot cup into the hot cup apparatus, and comprising a mounting bracket for being mounted to a support surface. The mounting bracket includes a mechanical interface for receiving and holding the hot cup in a stationary position adjacent the mounting bracket. A glide block is mounted on said mounting bracket and extends outwardly therefrom in partially-surrounding relation to the hot cup. The glide block includes a space for receiving an arcuate retaining lever mounted for movement between a removal position wherein the retaining lever is retracted into the space in the glide block sufficiently to allow the hot cup to be positioned into and removed from the position adjacent the mounting bracket, and a retention position wherein the retaining lever is extended around the hot cup sufficiently to retain the hot cup in the position adjacent the mounting bracket. A mechanical locking device cooperates with the glide block and the retaining lever for locking the lever into the removal position and the retention position when the retaining lever is positioned in the removal and retention positions, respectively.

According to one preferred embodiment of the invention, the glide block comprises upper and lower vertically spaced-apart glide block elements defining the space therebetween.

According to another preferred embodiment of the invention, the glide block comprises upper and lower vertically spaced-apart glide block elements defining the space therebetween, and said locking device comprises a first lock element carried by one of the upper or lower glide block elements which is biased onto the retaining lever, and complementary lock elements cooperating with the biasing element for locking the retaining lever into a predetermined one of the removal and retention positions.

According to yet another preferred embodiment of the invention, the first lock element comprises a spring-loaded ball, and said second complementary lock element comprises first and second spaced-apart detents for receiving the spring-loaded ball and thereby locking the lever into the removal position and the retention position when the retaining lever is positioned in the removal and retention positions, respectively.

According to yet another preferred embodiment of the invention, the spring-loaded ball is positioned in a cavity formed in a lower surface of the upper glide block element, and said detents are formed in an upper surface of the lower glide block element for receiving said ball when said ball and one or the other of the detents are in registration with each other.

According to yet another preferred embodiment of the invention, said retaining lever includes an outwardly-projecting handle for use in moving the retaining lever.

According to yet another preferred embodiment of the invention, the glide block elements each include an arcuate surface for engaging and stabilizing the hot cup in its retention position.

According to yet another preferred embodiment of the invention, the mechanical interface includes an electrical interconnection for supplying electric current from an electrical supply source to a heating element in the hot cup.

According to yet another preferred embodiment of the invention, the electrical interconnection includes a plurality of female electrical receptacles positioned in said mounting bracket for receiving a plurality of complementary male electrical plugs carried by said hot cup.

According to yet another preferred embodiment of the invention, said hot cup apparatus is adapted for use in an aircraft galley.

According to yet another preferred embodiment of the invention, a hot cup apparatus is provided which includes a locking device for locking a hot cup into the hot cup apparatus, and comprising a mounting bracket for being mounted to a support surface. The mounting bracket includes a mechanical interface for receiving and holding the hot cup in a stationary position adjacent the mounting bracket. Upper and lower vertically spaced-apart glide block elements define a space therebetween and extending outwardly therefrom in partially-surrounding relation to the hot cup. The glide block includes an arcuate space therein, with an arcuate retaining lever mounted for movement in the arcuate space in the glide block between a removal position wherein the retaining lever is retracted into the space in the glide block sufficiently to allow the hot cup to be positioned into and removed from the position adjacent the mounting bracket; and a retention position wherein the retaining lever is extended from the arcuate space and around the hot cup sufficiently to retain the hot cup in the position adjacent the mounting bracket. A mechanical locking device is provided for cooperating with the glide block and the retaining lever for locking the lever into the removal position and the retention position when the retaining lever is positioned in the removal and retention positions, respectively.

According to yet another preferred embodiment of the invention, the mechanical interface includes an electrical interconnection for supplying electric current from an electrical supply source to a heating element in the hot cup.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
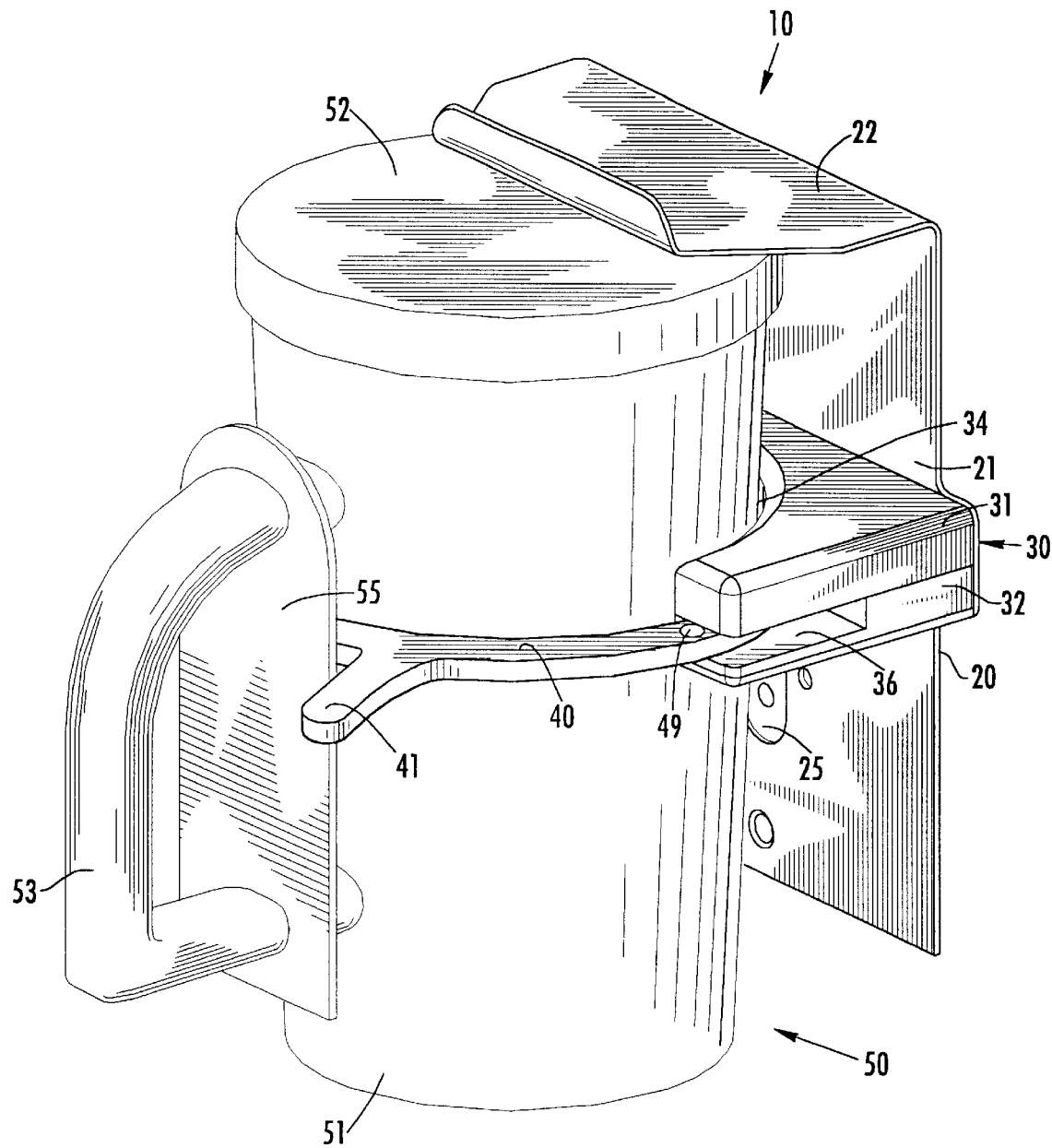
FIG. 1 is a perspective view of the hot cup apparatus.

Referring now specifically to the drawings, a hot cup apparatus according to the present invention is illustrated in FIG. 1 and shown generally at reference numeral 10. The hot cup apparatus 10 includes a mounting bracket 20, a glide block 30 and a retaining lever 40. The hot cup apparatus 10 is designed to receive and retain a conventional hot cup 50, such as a hot cup made by Helmco-Lacy. The hot cup includes a cylindrical body 51, a lid 52, a handle 53, and a heat shield 55. The hot cup 50 also includes a male electrical plug assembly, not shown.

The mounting bracket 20 includes a back plate 21 which is attached and carried by a galley surface and an integrally-formed top plate 22 which rests on the top of the lid 52 of the hot cup 50 and keeps the lid on the body 51. The back plate 21 also includes an electrical interconnection assembly 25 which receives the male plug assembly of the hot cup 50 and connects the mounting bracket 20 to the electrical system of the aircraft or other environment. This interconnection also assists in positioning and supporting the hot cup 50 in the mounting bracket 20. A static ground element 26 is attached to the back plate 21 and contacts the body 51 of the hot cup 50 and dissipates any static charge which may result from a difference in potential between the hot cup 50 and the hot cup apparatus 10.

Figure 2:
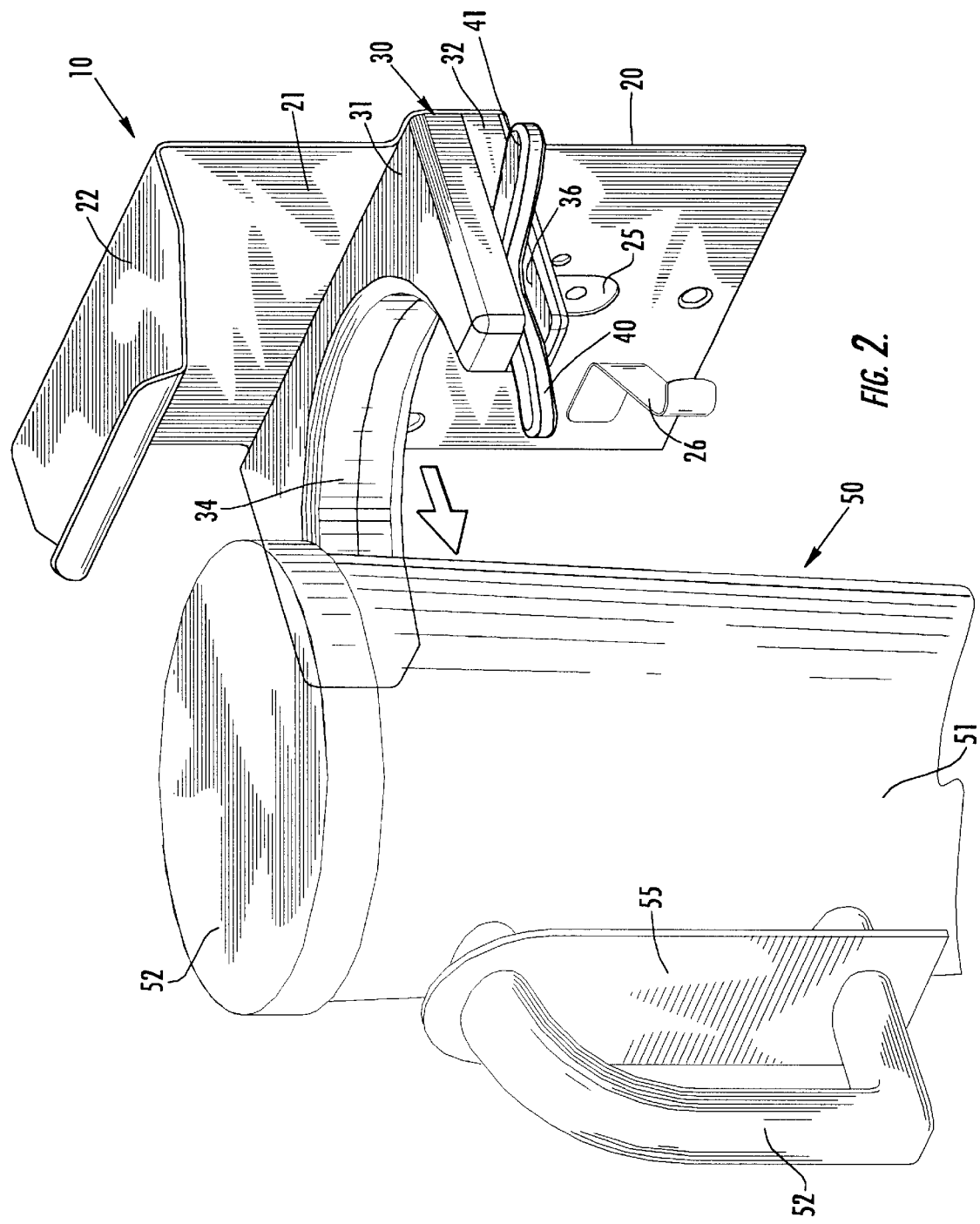
FIG. 2 is a fragmentary perspective view of the hot cup apparatus, showing removal of the hot cup from the hot cup apparatus.
Figure 3:
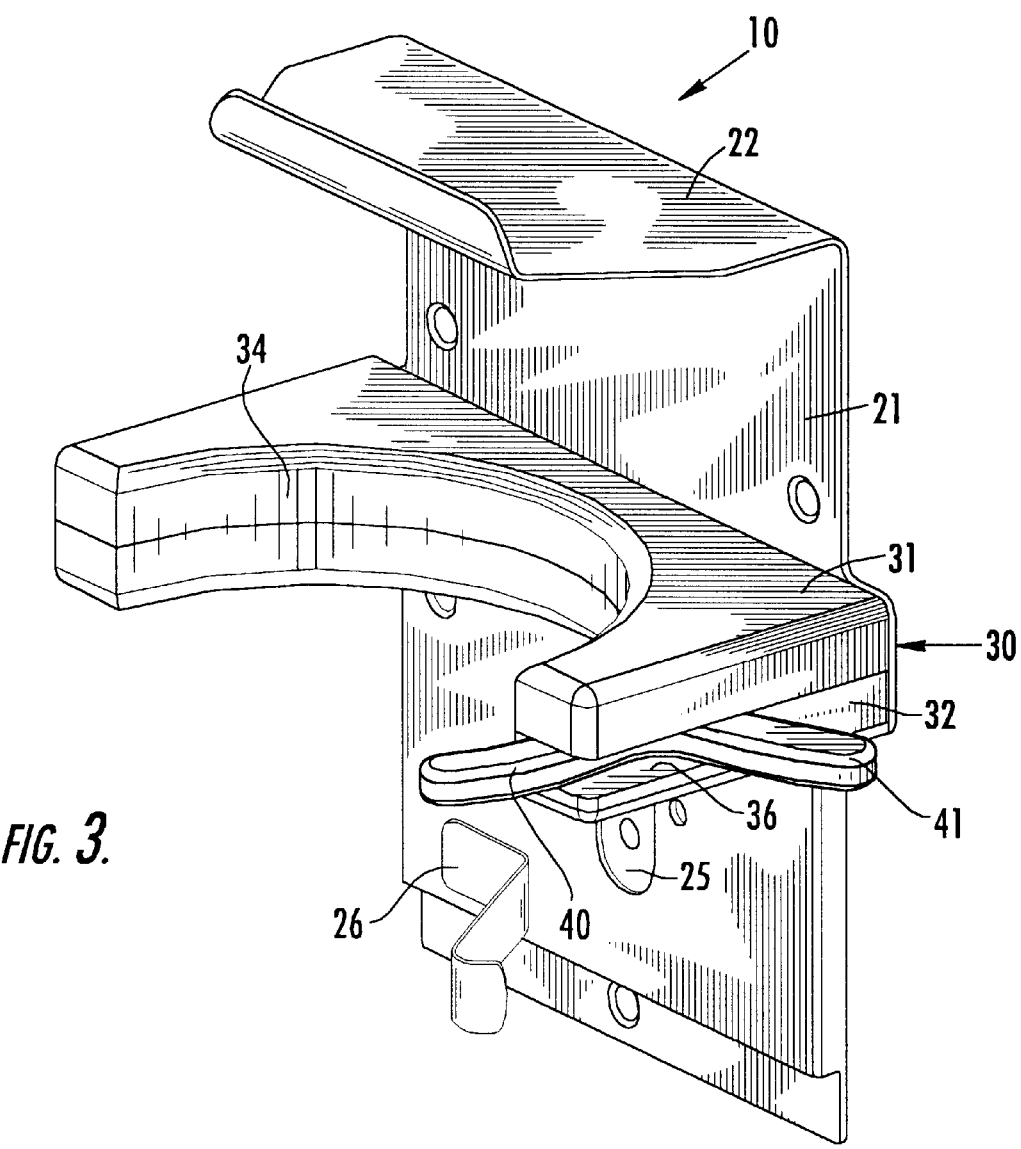
FIG. 3 is a perspective view of the mounting bracket of the hot cup apparatus.

The glide block 30 is mounted on the back plate 21 of the mounting bracket 20 and properly orients the hot cup 50. The glide block 30 includes an upper glide block element 31 and a lower glide block element 32. These glide block elements 31, 32 are stacked vertically and define a forward-extending arcuate surface 34 (See also FIGS. 2 and 3) which defines an arc which corresponds with the arc defined by the forward side of the cylinder which forms the body of the hot cup 50. This surface 34 stabilizes the hot cup 50 and prevents lateral movement and/or rotation when positioned in the hot cup apparatus 10.

Figure 4:
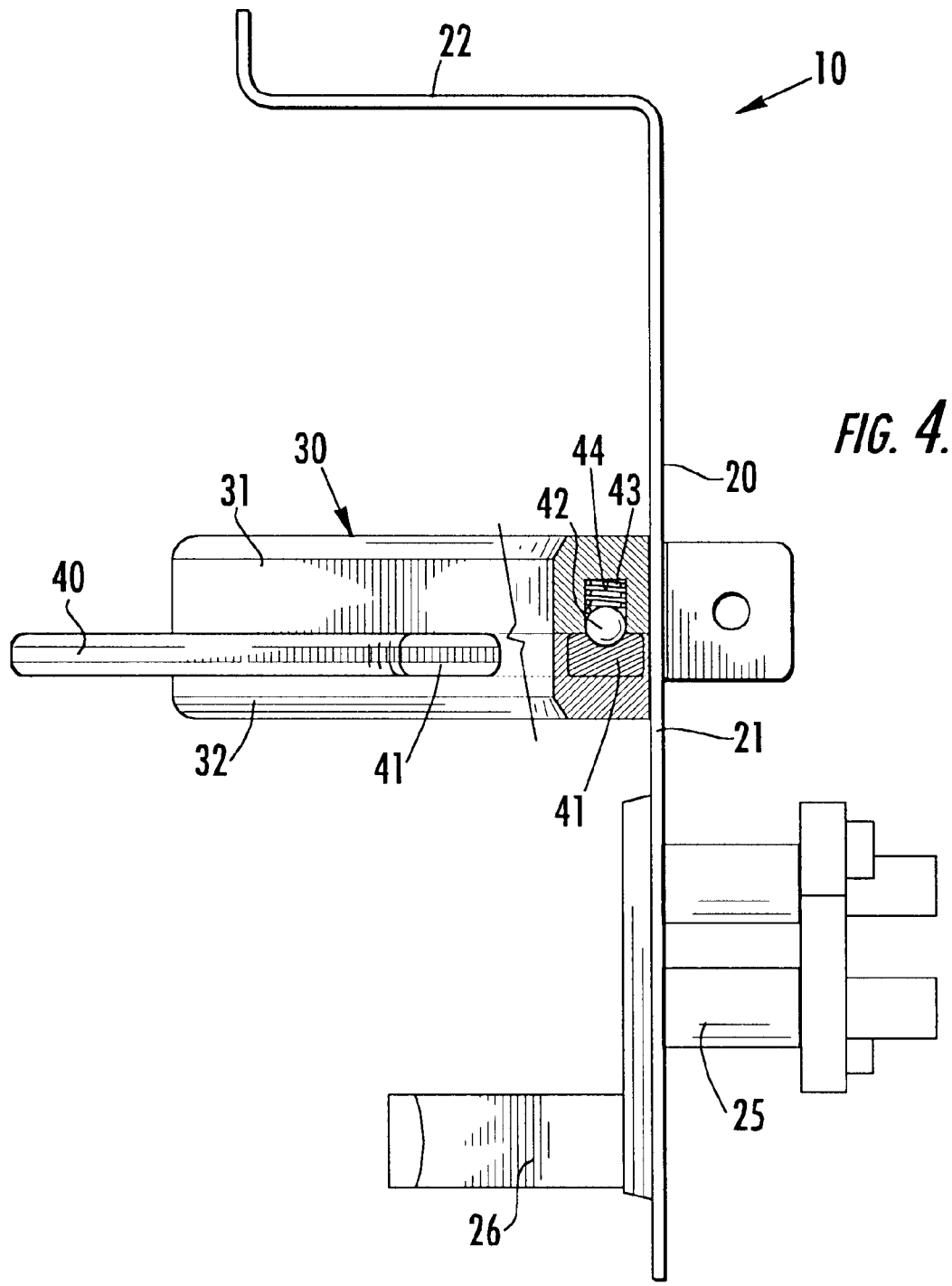
FIG. 4 is a partial vertical cross-section showing the locking device in the removal position.

The upper and lower glide blocks 31, 32 also define between them a space 36 in which is captured the retaining lever 40. The retaining lever 40 moves in this space 36 between two positions—a retention position shown in FIG. 1 and a removal position shown in FIGS. 2 and 3. The retaining lever 40 includes an outwardly-projecting handle 41 which permits easy manual operation of the retaining lever 40. This arrangement is shown in cross-section in FIG. 4. A ball 42 biased by a spring 43 is captured in a cavity 44 in the lower surface of the upper glide block 31.

Figure 5:
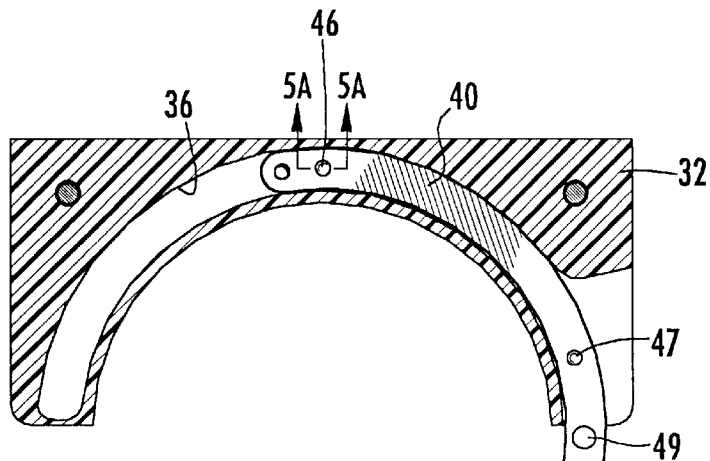
FIG. 5 is a horizontal cross-section through the lower guide block of the hot cup apparatus showing the retaining lever in the retention position.
Figure 5A:
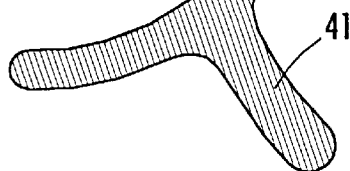
FIG. 5A is an enlarged vertical cross-section taken along line 5A—5A in FIG. 5.
Figure 6:
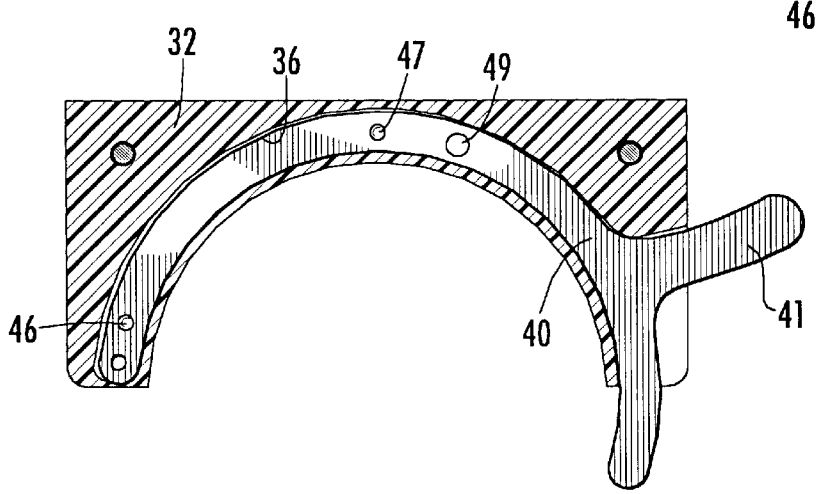
FIG. 6 is a horizontal cross-section through the lower guide block of the hot cup apparatus showing the retaining lever in the removal position.

Referring now to FIGS. 5, 5A and 6, this arrangement is shown in greater detail. As is shown in FIGS. 5 and 6, the upper surface of the retaining lever 40 includes two spaced-apart detents 46 and 47. These two detents create positive lock positions for the retaining lever 40 in the retention and removal positions, respectively. In the retention position shown in FIG. 5, the retaining lever 40 is extended in a arcuate manner from the glide block assembly 30 and extends partially around the hot cup 50. See also FIG. 1. The retaining lever 40 is locked in the retention position shown in FIG. 1 in the manner shown in FIG. 5A by the ball 42 biased into the detent 46. The biasing force of the spring 43 is sufficient to prevent accidental movement of the retaining lever 40 from the retention position, by vibration, impact or otherwise. A visual indicator, such as a brightly-colored spot 49 on the upper surface of the retaining lever 40 provides a positive visual indication that the retaining lever 40 has been extended sufficiently to lock the ball 42 into the detent 42.

To remove the hot cup 50, the handle 41 is pushed rearwardly towards the glide block assembly 30. Alternatively, the hot cup 50 may be pulled away from the hot cup apparatus 10, thereby pushing the retaining lever 40 at least partially into the removal position. As the retaining lever 40 is moved, the ball 42 is forced from the detent 46 by a shearing force of the retaining lever 40 relative to the lower glide block 32. The ball 42 rolls along the top surface of the retaining lever 40 until it reaches the detent 47. The ball 42 seats into the detent 47, locking the retaining lever 40 into the removal position. The locking force is sufficient to prevent the retaining lever 40 from being inadvertently moved towards the retention position. This insures that when a user inserts the hot cup 50 into the hot cup apparatus 10, the retaining lever 40 does not interfere.

Figure 7:
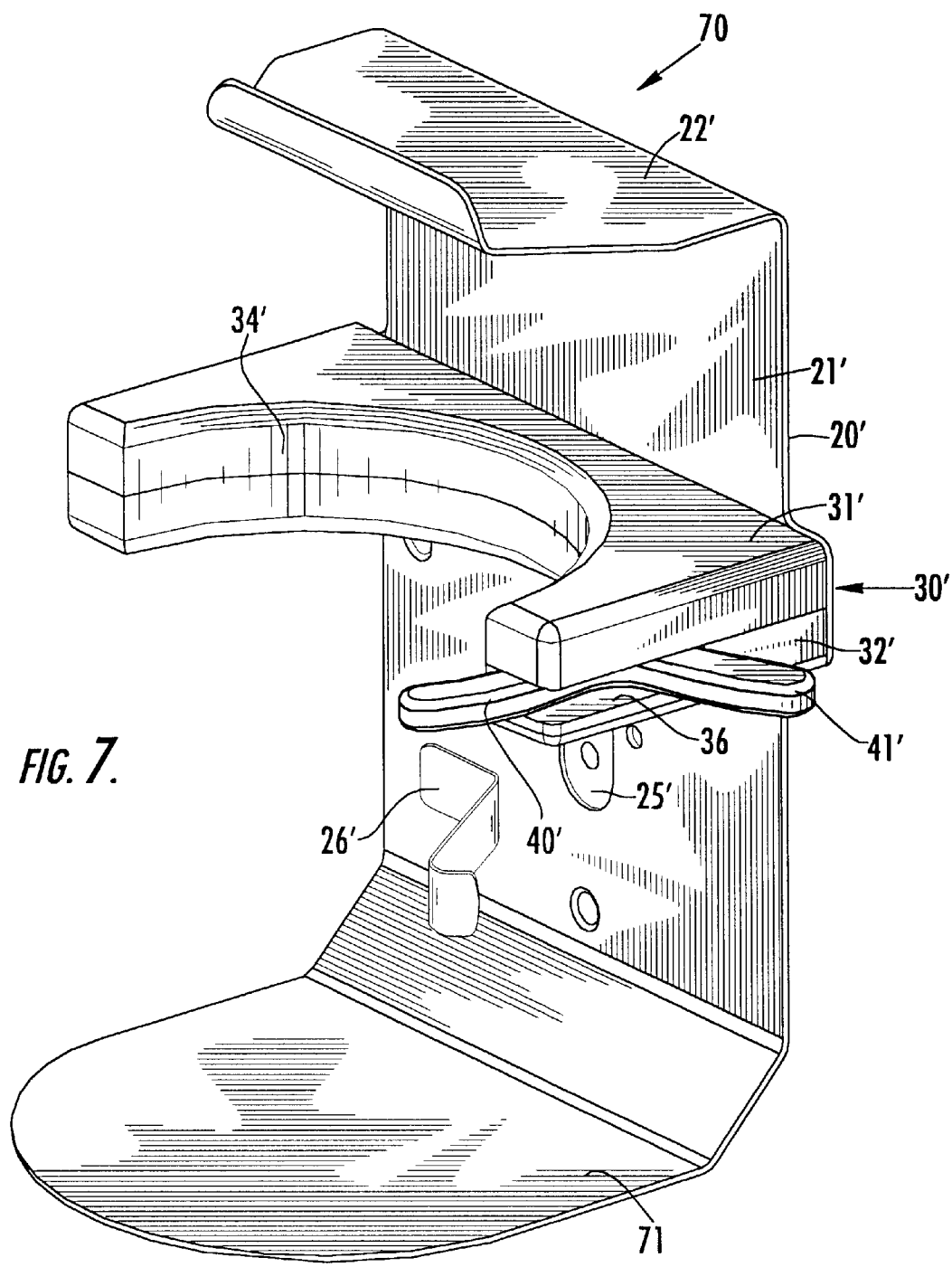
FIG. 7 is a perspective view of an alternative mounting bracket.

Referring now to FIG. 7, an alternative embodiment of a hot cup apparatus 70 includes a bottom support 71. Otherwise, the hot cup apparatus 70 is substantially identical to the hot cup apparatus 10 shown in FIGS. 1–6, with like elements being indicated by prime notation.

A hot cup apparatus is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A hot cup apparatus including a locking device for locking a hot cup into the hot cup apparatus, and comprising:

(a) a mounting bracket for being mounted to a support surface;

(b) a glide block mounted on said mounting bracket and extending outwardly therefrom in partially-surrounding relation to the hot cup, said glide block including a space therein, wherein said glide block further comprises upper and lower vertically spaced-apart glide block elements defining the space therebetween;

(c) an arcuate retaining lever mounted for movement in the space in the glide block between:

(i) a removal position wherein the retaining lever is retracted into the space in the glide block sufficiently to allow the hot cup to be positioned into and removed from the position adjacent the mounting bracket; and (ii) a retention position wherein the retaining lever is extended around the hot cup sufficiently to retain the hot cup in the position adjacent the mounting bracket; and (d) a mechanical locking device cooperating with the glide block and the retaining lever for locking the lever into the removal position and the retention position when the retaining lever is positioned in the removal and retention positions, respectively, said mechanical locking device including:

(i) a first lock element comprising a spring-loaded ball carried by one of the upper or lower glide block elements and biased onto the retaining lever, and a complementary second lock element cooperating with the biasing element for locking the retaining lever into a predetermined one of the removal and retention positions; and (ii) first and second spaced-apart detents for receiving the spring-loaded ball and thereby locking the lever into the removal position and the retention position when the retaining lever is positioned in the removal and retention positions, respectively.

2. A hot cup apparatus according to claim 1, wherein said spring-loaded ball is positioned in a cavity formed in a lower surface of the upper glide block element, and wherein said detents are formed in an upper surface of the lower glide block element for receiving said ball when said ball and one or the other of the detents are in registration with each other.

3. A hot cup apparatus according to claim 1, and wherein said retaining lever includes an outwardly-projecting handle for use in moving the retaining lever.

4. A hot cup apparatus according to claim 1, wherein said glide block elements each include an arcuate surface for engaging and stabilizing the hot cup in its retention position.

5. A hot cup apparatus according to claim 1, and further comprising a mechanical interface including an electrical interconnection for supplying electric current from an electrical supply source to a heating element in the hot cup.

6. A hot cup apparatus according to claim 5, wherein said electrical interconnection includes a plurality of female electrical receptacles positioned in said mounting bracket for receiving a plurality of complementary male electrical plugs carried by said hot cup.

7. A hot cup apparatus according to claim 1, 5 or 6, wherein said hot cup apparatus is adapted for use in an aircraft galley.

8. A hot cup apparatus including a locking device for locking a hot cup into the hot cup apparatus, and comprising:

(a) a mounting bracket for being mounted to a support surface;

(b) upper and lower vertically spaced-apart glide block elements defining a space therebetween and extending outwardly therefrom in partially-surrounding relation to the hot cup, said glide block including an arcuate space therein;

(c) an arcuate retaining lever mounted for movement in the arcuate space in the glide block between:

(i) a removal position wherein the retaining lever is retracted into the space in the glide block sufficiently to allow the hot cup to be positioned into and removed from the position adjacent the mounting bracket; and (ii) a retention position wherein the retaining lever is extended from the arcuate space and around the hot cup sufficiently to retain the hot cup in the position adjacent the mounting bracket; and (d) a mechanical locking device cooperating with the glide block and the retaining lever for locking the lever into the removal position and the retention position when the retaining lever is positioned in the removal and retention positions, respectively.

9. A hot cup apparatus according to claim 8, and further comprising a mechanical interface including an electrical interconnection for supplying electric current from an electrical supply source to a heating element in the hot cup.

* * * * *